(12) United States Patent
Shimizu

(10) Patent No.: US 7,419,454 B2
(45) Date of Patent: Sep. 2, 2008

(54) ANNULAR GEAR

(75) Inventor: Takashi Shimizu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 96 days.

(21) Appl. No.: 11/261,485

(22) Filed: Oct. 31, 2005

(65) Prior Publication Data

US 2006/0111218 A1 May 25, 2006

(30) Foreign Application Priority Data

Nov. 24, 2004 (JP) ............................. 2004-338769

(51) Int. Cl.
*F16H 57/08* (2006.01)

(52) U.S. Cl. ...................... 475/331; 475/344

(58) Field of Classification Search ................. 475/331, 475/337, 344, 345, 316; 192/70.2
See application file for complete search history.

(56) References Cited

U.S. PATENT DOCUMENTS

| | | | |
|---|---|---|---|
| 4,715,243 A | 12/1987 | Morishita et al. | |
| 4,838,123 A * | 6/1989 | Matoba | 475/335 |
| 5,188,575 A * | 2/1993 | Leising et al. | 475/280 |
| 5,554,082 A * | 9/1996 | Umeyama et al. | 475/338 |
| 5,679,089 A * | 10/1997 | Levedahl | 475/332 |
| 6,402,653 B1 * | 6/2002 | Jensen | 475/149 |
| 6,692,401 B2 * | 2/2004 | Hofschulte et al. | 475/331 |
| 2001/0035012 A1 * | 11/2001 | Smith | 60/435 |
| 2003/0162630 A1 * | 8/2003 | Poulin et al. | 475/331 |

FOREIGN PATENT DOCUMENTS

JP 2005-69401 3/2005

* cited by examiner

*Primary Examiner*—Sherry Estremsky
*Assistant Examiner*—Edwin A Young
(74) *Attorney, Agent, or Firm*—Oblon, Spivak, McClelland, Maier & Neustadt, P.C.

(57) ABSTRACT

A ring gear is an annular gear having an annular base portion with a predetermined constant width, and the annular base portion is provided with a gear on an entire periphery thereof. The base portion includes a first wall thickness portion having a first wall thickness, and a second wall thickness portion having a second wall thickness thicker than the first wall thickness.

15 Claims, 4 Drawing Sheets

ANNULAR GEAR

INCORPORATION BY REFERENCE

The disclosure of Japanese Patent Application No. 2004-338769 filed on Nov. 24, 2004 including the specification, drawings and abstract is incorporated herein by reference in its entirety.

BACKGROUND OF THE INVENTION

1. Field of the Invention

The invention relates to an annular gear that is used as a mechanism for transmitting power in various power transmission devices.

2. Description of the Related Art

Cited as one example of power transmission devices is a transmission mounted in a vehicle. In a transmission, a combination of various types of gears is used to transmit power, and a planetary gear unit is used in many cases. Gears that construct the planetary gear unit are a ring gear, a sun gear, and a pinion gear. As the ring gear, an annular gear with internal teeth is used. As the sun gear and a pinion gear, annular gears with external teeth are used.

Meanwhile, noise generated in the transmission has been a problem in the past, particularly gear noise. To address the problem, a transmission case is reinforced and vehicle sound insulation is strengthened. This, however, results in an increase in cost and weight. Further, countermeasures have not yet been taken for the aforementioned various types of annular gears from the standpoint of gear noise reduction.

SUMMARY OF THE INVENTION

The problem to be solved by an aspect of the invention is gear noise generation caused by annular gears used in a planetary gear unit and the like. It is an object of the invention, therefore, to provide an annular gear having a construction that is capable of reducing gear noise generation without causing an increase in cost and weight.

An annular gear according to the aspect of the invention is provided with an annular base portion, and the annular base portion is provided with a gear on an entire periphery thereof. The base portion includes a first wall thickness portion having a first wall thickness, and a second wall thickness portion having a second wall thickness thicker than the first wall thickness.

According to the annular gear with the above configuration, in the process of movement over time of a gear meshing point, the mounting stiffness of the meshing gears increases when gears mesh at the second wall thickness portion, i.e., at a thick position in the base portion. On the other hand, when the gears mesh at the first wall thickness portion, i.e., at a thinner position in the base portion than the second wall thickness portion, the mounting stiffness of the meshing gears decreases. Thus, the stiffness of a vibration system varies, thereby suppressing the growth of resonance which is a factor of gear noise generation. As a result, gear noise generation can be reduced.

Further, the annular gear may be provided with internal teeth on an inner peripheral surface of the base portion. In addition, the annular gear may be provided with a plurality of spline teeth on an outer peripheral surface of the second wall thickness portion.

Moreover, the annular gear may be provided with external teeth on an outer peripheral surface of the base portion. In addition, the annular gear may be provided with a plurality of spline teeth on an inner peripheral surface of the second wall thickness portion.

In the annular gear, the second wall thickness may be two to three times as thick as the first wall thickness.

In the annular gear, the annular gear may be employed in a planetary gear unit.

DETAILED DESCRIPTION OF THE PREFERRED EMBODIMENTS

Figure 1:
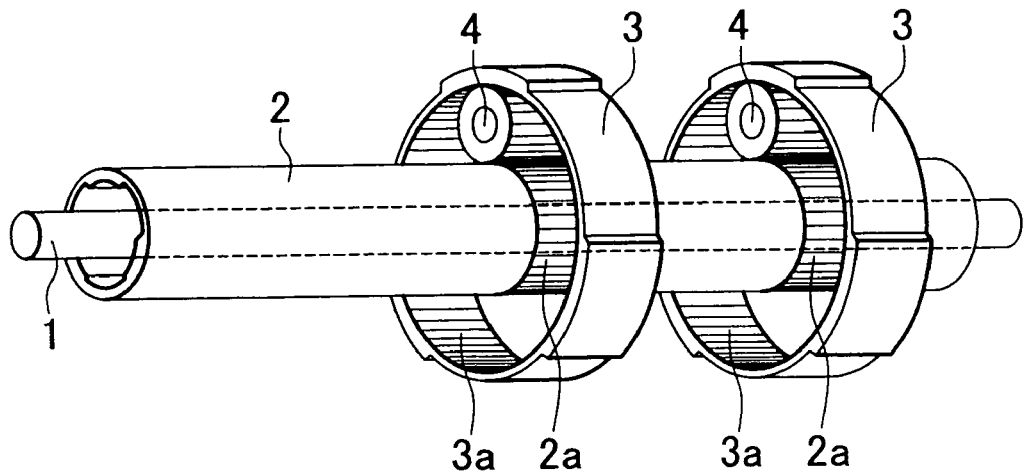
FIG. 1 is a perspective view showing the construction of a planetary gear unit in which an annular gear according to an embodiment of the invention is employed.
Figure 2:
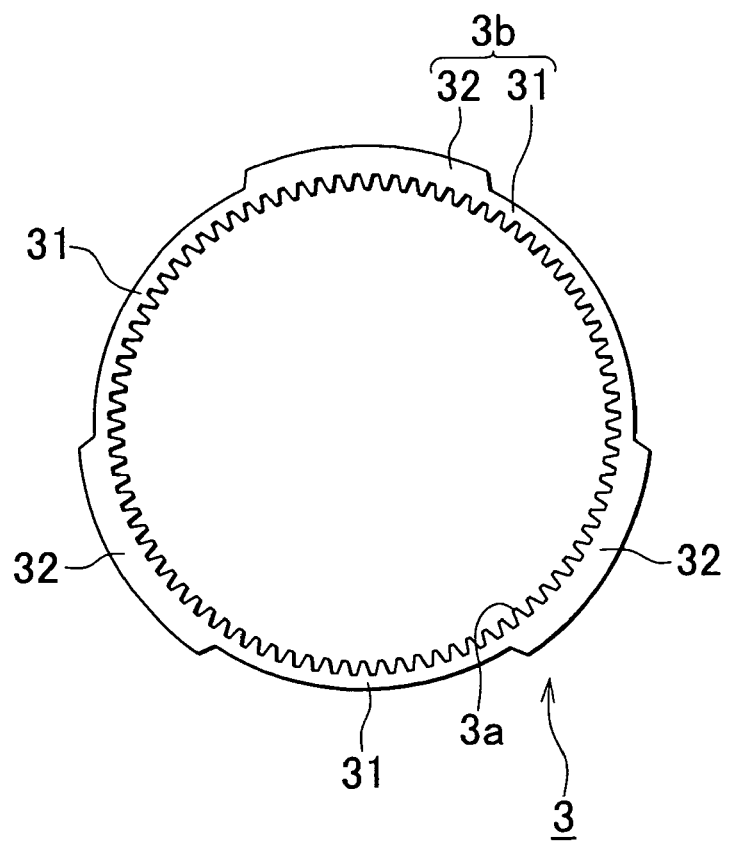
FIG. 2 is a side view showing the construction of the annular gear according to the embodiment of the invention.
Figure 3A:
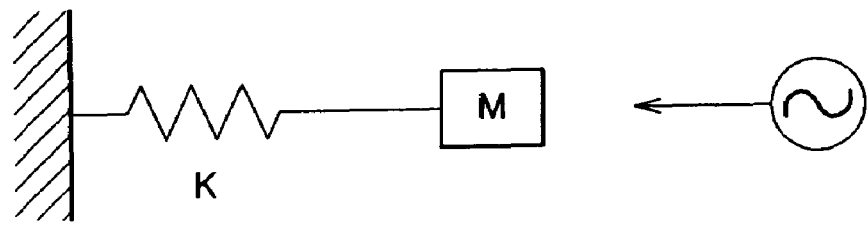
FIGS. 3A and 3B are views for illustrating suppression of the growth of resonance in the annular gear according to the embodiment.
Figure 3B:
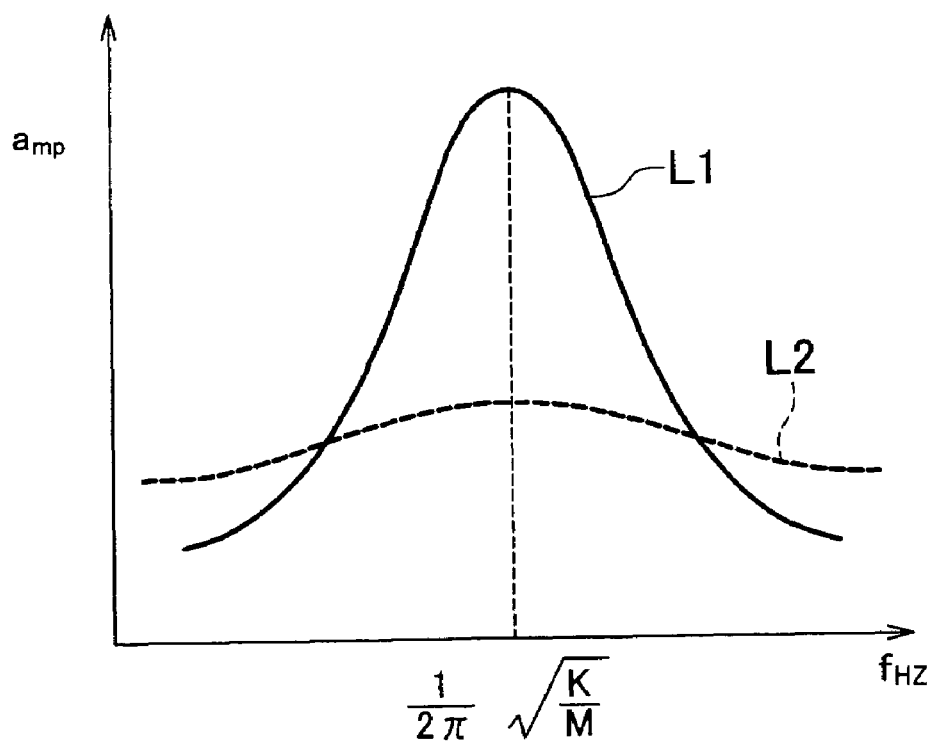

Hereinafter, the construction of annular gears according to embodiments of the invention will be described with reference to the accompanying drawings. The construction of an annular gear according to an embodiment of the invention will first be described with reference to FIGS. 1 to 3. FIG. 1 is a perspective view showing the construction of a planetary gear unit in which the annular gear according to the embodiment of the invention is employed. FIG. 2 is a side view showing the construction of the annular gear according to the embodiment. FIGS. 3A and 3B are views for illustrating suppression of the growth of resonance in the annular gear according to the embodiment.

First, as shown in FIG. 1, this planetary gear unit is provided with a sun gear 2 on an outer side of a shaft 1. Further, a ring gear 3 is provided on an outer side of the sun gear 2, and a pinion gear 4 is provided between the sun gear 2 and the ring gear 3. The sun gear 2 has an annular shape, and an outer peripheral surface thereof is formed with an external gear 2a meshing with the pinion gear 4. Further, the ring gear 3 has an annular shape, and an inner peripheral surface thereof is formed with an internal gear 3a meshing with the pinion gear 4.

Next, with reference to FIG. 2, the construction of the ring gear 3 will be described in detail. The ring gear 3 is an annular gear having an annular base portion 3b with a predetermined constant width, and the annular base portion 3b is provided with the internal gear 3a on an entire inner periphery thereof. The base portion 3b includes first wall thickness portions 31 each having a first wall thickness, and second wall thickness portions 32 each having a second wall thickness that is thicker than the first wall thickness. Note that wall thickness means a thickness from a tooth bottom position to an outer peripheral surface of the base portion 3b. According to the embodiment, the first wall thickness is from 4 mm to 5 mm, and the second wall thickness is from 8 mm to 15 mm. Where the first wall thickness is denoted by L, the second wall thickness is set two to three times greater than L.

Further, in the ring gear 3, the first wall thickness portions 31 and the second wall thickness portions 32 are respectively provided at three locations, and are alternately arranged. Moreover, the second wall thickness portions 32 are arranged at equal intervals.

According to the ring gear 3 of the embodiment with the above configuration, in the process of movement over time of a meshing point at which the internal gear 3a meshes with the pinion gear 4, the mounting stiffness of the meshing gears increases when the gears mesh at each of the second wall thickness portions 32, i.e., at a thick position in the base portion 3b. On the other hand, when the gears mesh at each of the first wall thickness portions 31, i.e., at a thinner position in the base portion 3b than each of the second wall thickness portions 32, the mounting stiffness of the meshing gears decreases. Thus, the stiffness of a vibration system varies, thereby suppressing the growth of resonance which is a factor of gear noise generation.

When resonance is expressed as a model as shown in FIG. 3A, and disturbance is added to an object with a mass M and a spring constant K, it is known that a resonance peak of $(2\pi)^{-1} \times (K/M)^{1/2}$ is normally generated as shown by a solid line L1 in FIG. 3B. With the configuration of the ring gear 3 according to the embodiment, however, the spring constant K changes between the case where the pinion gear 4 meshes with the first wall thickness portions 31 and the case where the pinion gear 4 meshes with the second wall thickness portions 32. Thus, generation of the resonance peak of $(2\pi)^{-1} \times (K/M)^{1/2}$ is suppressed, and a smooth vibration curve appears as shown by a dotted line L2 in FIG. 3B. As a result, it is possible to reduce the generation of gear noise.

Moreover, in annular gears, in general, a vibration curve that becomes elliptic is likely to appear. The above configuration also enables suppression of the generation of the vibration curve that becomes elliptic, by alternately arranging the first wall thickness portions 31 and the second wall thickness portions 32 respectively at three locations.

Vibration curve generation can be suppressed in this manner. This allows a reduction in gear noise, and omits the necessity of a case reinforcement for the purpose of reducing noise in a transmission. Furthermore, it is possible to reduce sound insulation materials. This also leads to improved drivability.

OTHER EMBODIMENTS

Figure 4:
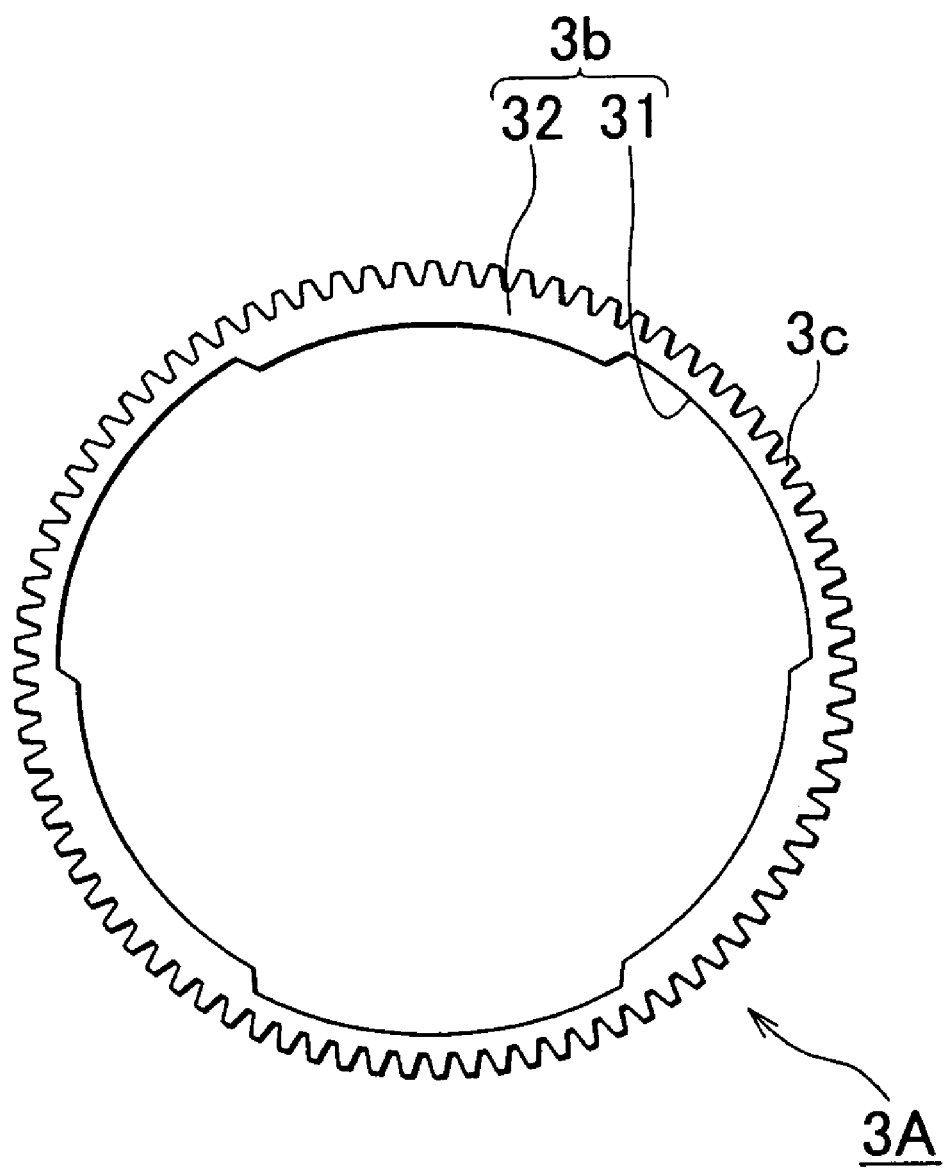
FIG. 4 is a side view showing the construction of an annular gear according to another embodiment of the invention.

In the above-described embodiment, the ring gear 3 formed with the internal gear 3a is described as one example. However, as another embodiment, for example, an annular gear 3A may be employed, which is formed with an external gear 3c on an outer peripheral side of the base portion 3b as shown in FIG. 4. In this case, the first wall thickness portions 31 and the second wall thickness portions 32 are provided at three locations on the inner side of the base portion 3b, and are alternately arranged. The second wall thickness portions 32 are arranged at equal intervals.

Figure 5:
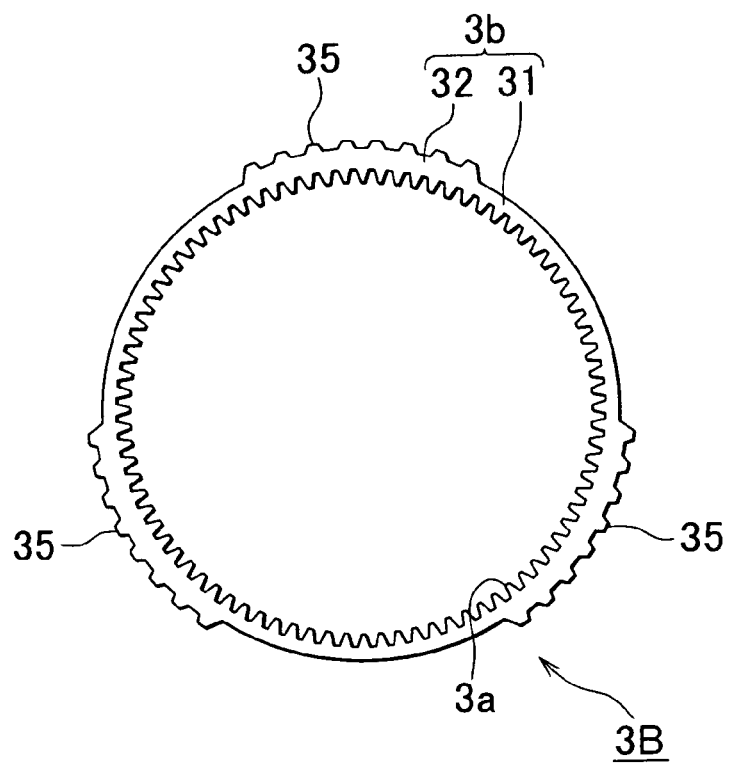
FIG. 5 is a side view showing the construction of an annular gear according to yet another embodiment of the invention.
Figure 6:
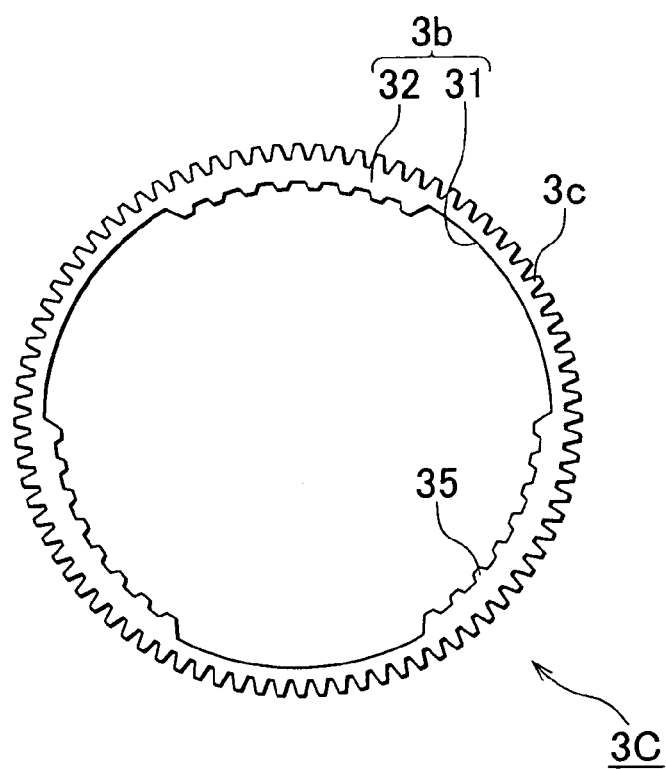
FIG. 6 is a side view showing the construction of an annular gear according to still yet another embodiment of the invention.

As yet another embodiment, an annular gear 3B shown in FIG. 5 may be employed. Although the basic configuration of the annular gear 3B is the same as that of the ring gear 3 shown in FIG. 2, a plurality of spline teeth 35 extending in an axial direction is formed on the outer peripheral surfaces of the second wall thickness portions 32 so as to connect to an external brake plate. Further, an annular gear 3C shown in FIG. 6 has basically the same configuration as the annular gear 3A shown in FIG. 4. In the annular gear 3C, however, the plurality of spline teeth 35 extending in the axial direction is formed on inner peripheral surfaces of the second wall thickness portions 32 so as to connect to external spline teeth. According to these other embodiments, the same operation and effect as those of the above-described embodiment can be obtained.

Accordingly, the embodiments disclosed above are merely examples in all respects, and are not to be interpreted to limit the invention. The technical scope of the invention, therefore, is not interpreted only by the above-described embodiments, but is defined on the basis of the scope of the claims. Further, all modifications within the scope of equivalents of the claims are included in the invention.

What is claimed is:

1. An annular gear, comprising:
an annular base portion; and
a gear on an entire periphery of the annular base portion, the gear including a plurality of teeth;
wherein the annular base portion includes a first wall thickness portion which has a first wall thickness that does not include the thickness of any teeth, and a second wall thickness portion which has a second wall thickness that does not include the thickness of any teeth and is thicker than the first wall thickness, wherein the second wall thickness portion includes a plurality of spline teeth, and wherein the first and second wall thickness portions are alternately arranged with respect to a circumferential direction of the annular base portion.

2. The annular gear according to claim 1, wherein the first wall thickness portion and the second wall thickness portion are respectively provided at three locations.

3. The annular gear according to claim 1, wherein the plurality of teeth are internal teeth provided on an inner peripheral surface of the annular base portion.

4. The annular gear according to claim 3, wherein the plurality of spline teeth are provided on an outer peripheral surface of the second wall thickness portion.

5. The annular gear according to claim 4, wherein the first wall thickness extends from a first tooth bottom position on the inner peripheral surface of the first wall thickness portion to an outer peripheral surface of the first wall thickness portion, and wherein the second wall thickness extends from a second tooth bottom position on the inner peripheral surface of the second wall thickness portion to a spline tooth bottom position on the outer peripheral surface of the second wall thickness portion.

6. The annular gear according to claim 1, wherein the plurality of teeth are external teeth provided on an outer peripheral surface of the base portion.

7. A planetary gear unit in which the annular gear according to claim 1 is employed.

8. The annular gear according to claim 1, wherein the plurality of spline teeth are located on the periphery of said second wall portion.

9. The annular gear according to claim 8, wherein the first wall portion is free of splines.

10. An annular gear, comprising:
an annular base portion; and
a gear on an entire periphery of the annular base portion, the gear including a plurality of teeth;
wherein the annular base portion includes a first wall thickness portion which has a first wall thickness that does not include the thickness of any teeth, and a second wall thickness portion which has a second wall thickness that does not include the thickness of any teeth and is thicker than the first wall thickness, wherein the second wall thickness portion includes a plurality of spline teeth, wherein the plurality of teeth are external teeth provided on an outer peripheral surface of the base portion, and wherein the plurality of spline teeth are provided on an inner peripheral surface of the second wall thickness portion.

11. The annular gear according to claim 1, wherein the second wall thickness is two to three times as thick as the first wall thickness.

12. The annular gear according to claim 10, wherein the first wall thickness extends from a first tooth bottom position on the outer peripheral surface of the first wall thickness portion to an inner peripheral surface of the first wall thickness portion, and wherein the second wall thickness extends from a second tooth bottom position on the outer peripheral surface of the second wall thickness portion to a spline tooth bottom position on the inner peripheral surface of the second wall thickness portion.

13. The annular gear according to claim 10, wherein the first wall thickness portion and the second wall thickness portion are respectively provided at three locations, and are alternately arranged.

14. The annular gear according to claim 10, wherein the second wall thickness is two to three times as thick as the first wall thickness.

15. A planetary gear unit in which the annular gear according to claim 10 is employed.

* * * * *